(12) United States Patent
Wittner

(10) Patent No.: US 7,064,458 B2
(45) Date of Patent: Jun. 20, 2006

(54) METHOD AND SYSTEM FOR TRANSFERRING A LOAD BETWEEN AC VOLTAGE SOURCES

(75) Inventor: Lupu Wittner, Netanya (IL)

(73) Assignee: Target Hi-Tech Electronics Ltd., Netanya (IL)

( * ) Notice: Subject to any disclaimer, the term of this patent is extended or adjusted under 35 U.S.C. 154(b) by 477 days.

(21) Appl. No.: 10/389,994

(22) Filed: Mar. 18, 2003

(65) Prior Publication Data

US 2004/0183378 A1 Sep. 23, 2004

(51) Int. Cl.
*H02J 3/00* (2006.01)

(52) U.S. Cl. .............................. 307/65; 307/43; 307/44; 307/80

(58) Field of Classification Search .................. 307/65, 307/44, 43, 66, 80, 64
See application file for complete search history.

(56) References Cited

U.S. PATENT DOCUMENTS

| | | | | |
|---|---|---|---|---|
| 3,601,659 A | * | 8/1971 | Tanaka | 361/65 |
| 5,646,458 A | * | 7/1997 | Bowyer et al. | 307/67 |
| 5,936,495 A | * | 8/1999 | LeCourt | 335/6 |
| 6,130,813 A | * | 10/2000 | Kates et al. | 361/93.1 |
| 6,144,115 A | * | 11/2000 | Massie et al. | 307/80 |
| 6,560,128 B1 | * | 5/2003 | Rajda et al. | 363/50 |
| 2002/0036430 A1 | * | 3/2002 | Welches et al. | 307/18 |
| 2003/0048004 A1 | * | 3/2003 | Fleming et al. | 307/64 |

* cited by examiner

*Primary Examiner*—Brian Sircus
*Assistant Examiner*—Daniel Cavallari
(74) *Attorney, Agent, or Firm*—Mark M. Friedman

(57) ABSTRACT

A method and system for transferring a load from a first AC voltage source to a second AC voltage source. A temporary voltage source is connected to the load and to the first voltage source via a resistor. The first voltage source is disconnected from the load. The second voltage source is connected to the load. Finally, the temporary voltage source is disconnected from the load. The temporary voltage source may be independent of the first and second voltage sources, or may obtain voltage from the first or second voltage sources. The connecting and disconnecting is done by mechanical switches, by thyristors, or by mechanical switches and thyristors in parallel or in series.

14 Claims, 3 Drawing Sheets

METHOD AND SYSTEM FOR TRANSFERRING A LOAD BETWEEN AC VOLTAGE SOURCES

FIELD AND BACKGROUND OF THE INVENTION

The present invention relates to a method of transferring an electrical load from one AC voltage source to another with no interruption of voltage during the switch.

There are several circumstances in which a load must be transferred from one AC voltage source to another. One example of such a circumstance is transferring a load from an electrical power grid to a generator in case of an anticipated power outage. Another example of such a circumstance is phase balancing, in which a load is transferred from one phase to another.

Prior art methods of transferring a load from one AC voltage source to another all entail an interruption of voltage for at least a short time interval. The duration of this time interval depends on the speed of the switching circuit used. In high current applications, the switching circuits are mechanical devices that are capable of withstanding high currents and very high short-circuit currents.

Many systems stop working, or else reset themselves, when their voltage supplies are interrupted or are significantly disturbed.

There is thus a widely recognized need for, and it would be highly advantageous to have, a method of transferring a load from one AC voltage source to another AC voltage source with no interruption of the voltage, with minimal distortion of the voltage and of the current, and with no interruption of the functioning of the load.

SUMMARY OF THE INVENTION

According to the present invention there is provided a method of transferring a load from an initial voltage source to a final voltage source, the load being initially connected to the initial voltage source, including the steps of: (a) connecting a temporary voltage source to the load; (b) disconnecting the initial voltage source from the load; and (c) connecting the final voltage source to the load.

According to the present invention there is provided a system for alternately connecting a first voltage source and a second voltage source to a load, including: (a) a first switching mechanism for connecting the first voltage source to the load and disconnecting the first voltage source from the load; (b) a second switching mechanism for connecting the second voltage source to the load and disconnecting the second voltage source from the load, the first and second switching mechanisms sharing a common connection point to the load; and (c) a third switching mechanism for connecting a temporary voltage source to the load at a second connection point between the common connection point and the load.

The basic method of the present invention is to transfer a load from an initial voltage source to a final voltage source by connecting a temporary voltage source to the load, disconnecting the initial voltage source from the load, connecting the final voltage source to the load and finally disconnecting the temporary voltage source from the load. The above time sequence is the preferred time sequence. In particular, it is preferred that the temporary voltage source be connected to the load before the initial voltage source is disconnected from the load.

Preferably, the temporary voltage source is independent of the initial and final voltage sources. Alternatively, the temporary voltage source obtains its voltage from either the initial voltage source or the final voltage source.

Preferably, when the temporary voltage source is connected to the load, the temporary voltage source is also connected to the initial voltage source; and when the initial voltage source is disconnected from the load, the initial voltage source is also disconnected from the temporary voltage source. Preferably, when the final voltage source is connected to the load, the final voltage source is also connected to the temporary voltage source; and when the temporary voltage source is disconnected from the load, the temporary voltage source is also disconnected from the final voltage source.

Preferably, the temporary voltage source is connected to the load via a resistor. Most preferably, the resistor has a resistance of at most one-tenth of the resistance of the load.

Preferably, the connecting and the disconnecting are done using respective switching mechanisms of the initial, final and temporary voltage sources. In one preferable alternative, at least one of the switching mechanisms includes a mechanical switch. In a second preferable alternative, at least one of the switching mechanisms includes a thyristor. In a third preferable alternative, at least one of the switching mechanisms includes both a mechanical switch and a thyristor. The mechanical switch and the thyristor may be in parallel or in series.

The basic system of the present invention includes three switching mechanisms: a first switching mechanism for connecting the first voltage source to the load and for disconnecting the first voltage source from the load; a second switching mechanism, for connecting the second voltage source to the load and for disconnecting the second voltage source from the load, that shares with the first switching mechanism a common connection point to the load; and a third switching mechanism, for connecting the temporary voltage source to the load and for disconnecting the temporary voltage source from the load, whose connection point to the load is between the load and the common connection point of the first two switching mechanisms.

Preferably, the system of then present invention also includes the temporary voltage source. Preferably, the temporary voltage source is independent of the first and second voltage sources. Alternatively, the temporary voltage source obtains its voltage from either the initial voltage source or the final voltage source.

Preferably, the system of the present invention also includes a resistor between the third switching mechanism and the third switching mechanism's connection point, such that when the temporary voltage source is connected to the load, that connection is via the resistor. Most preferably, the resistance of the resistor is at most one-tenth of the resistance of the load.

In one preferable alternative, at least one of the switching mechanisms includes a mechanical switch. In a second preferable alternative, at least one of the switching mechanisms includes a thyristor. In a third preferable alternative, at least one of the switching mechanisms includes both a mechanical switch and a thyristor. The mechanical switch and the thyristor may be in parallel or in series.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method and system for transferring a load from one AC voltage source to another AC voltage source. Specifically, the present invention can be used for phase balancing.

The principles and operation of electrical load transfer according to the present invention may be better understood with reference to the drawings and the accompanying description.

The basic principle of the present invention is that, in transferring a load from a first AC voltage source to a second AC voltage, source, a temporary voltage source, which may be a separate third voltage source or which may obtain its voltage from the second voltage source, provides voltage to the load during the time interval between the disconnection of the first voltage source from the load and the connection of the second voltage source to the load.

Figure 1:
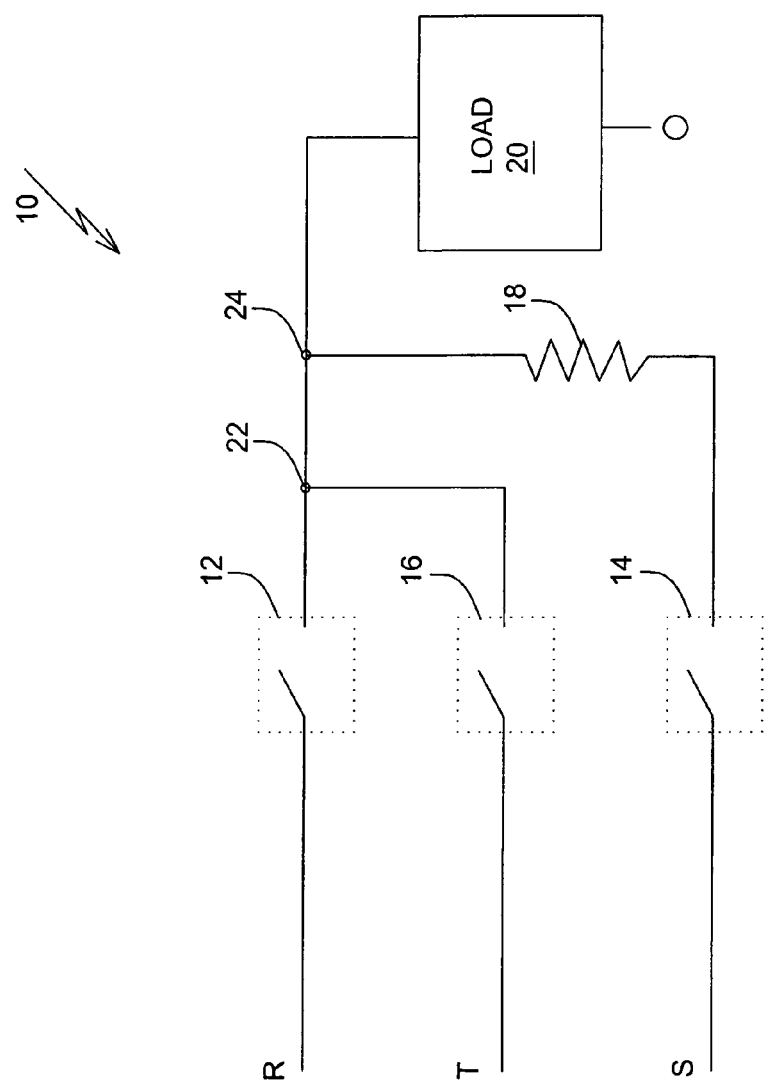
FIG. 1 is a circuit diagram of a first embodiment of a system of the present invention.
Figure 2:
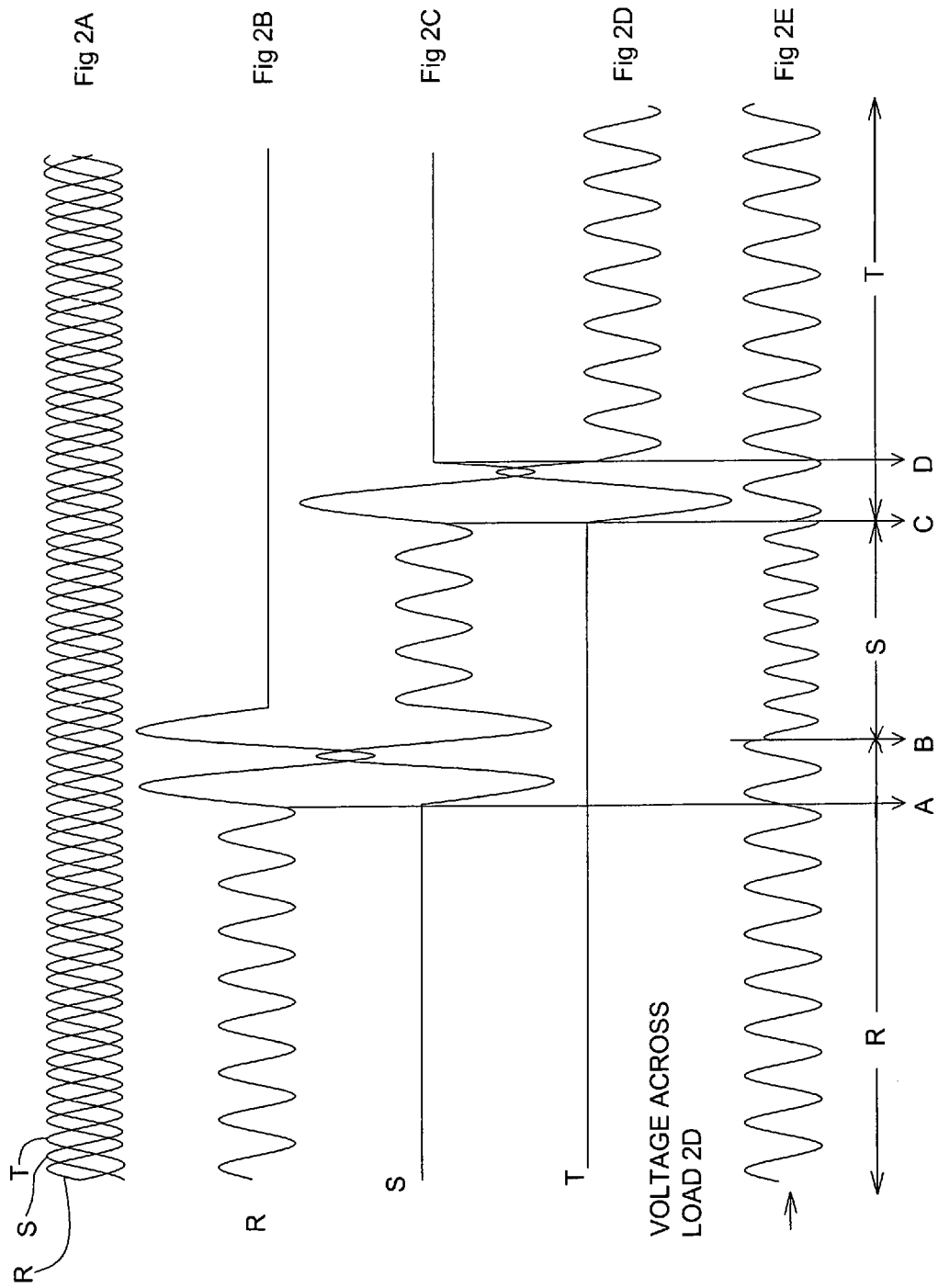
FIGS. 2A through 2E illustrate waveforms that are useful in understanding the present invention

Referring now to the drawings, FIG. 1 is a circuit diagram of a system 10 of the present invention, and FIGS. 2A through 2E illustrate waveforms that are useful in understanding the present invention. FIGS. 2A through 2E share a common horizontal (time) coordinate. In FIGS. 2A and 2E, the vertical coordinates are relative voltages. In FIGS. 2B, 2C and 2D, the vertical coordinates are relative currents.

An electrical power grid provides three-phase AC voltage. The three phases are three voltage sources R, S and T. FIG. 2A shows the waveforms of the three voltages as provided by the electrical power grid. Voltage sources R, S and T are 120 degrees apart.

System 10 includes three switching mechanisms 12, 14 and 16. Switching mechanism 12 alternately connects a load 20 to voltage source R and disconnects load 20 from voltage source R. Switching mechanism 14 alternately connects load 20 to voltage source S and disconnects load 20 from voltage source S. Switching mechanism 16 alternately connects load 20 to voltage source T and disconnects load 20 from voltage source T. Voltage sources R and T share a common connection point 22 to load 20. Voltage source S has its own connection point 24 to load 20, via a resistor 18.

It now will be described how the present invention transfers load 20 from voltage source R to voltage source T.

Initially, switching mechanism 12 is closed and switching mechanisms 14 and 16 are open, so that load 20 is connected only to voltage source R.

At time A, switching mechanism 14 is closed, thereby connecting voltage source S to load 20, and thereby allowing current from voltage source S to flow towards load 20 and towards voltage source R. Because the resistance of load 20 is much greater than the resistance of voltage source R, almost all of the current from voltage source S flows towards voltage source R. The magnitude of the current from voltage source S to voltage source R depends on the resistance of resistor 18 and on the voltages.

Between times A and B, the voltage from voltage source S is in a standby state.

At time B, switching mechanism 12 is opened, thereby disconnecting voltage source R from load 20. The flow of current from voltage source R to load 20 ceases. The flow of current from voltage source S to voltage source R also ceases. Instead, because the only path now available to the current from voltage source S is the path that leads to load 20, the current from voltage source S now flows to load 20. In this intermediate state, the voltage across load 20 depends on how the voltage from voltage source S is divided between resistor 18 and load 20. Preferably, the resistance of resistor 18 is at most 10% of the resistance of load 20, so that the decrease in the voltage supplied to load 20 during this intermediate state is no more than 10%. When switching mechanisms 12, 14 and 16 are based on mechanical switches, the duration of this intermediate state depends on the mechanical properties of the switches. In one exemplary embodiment of system 10, the duration of this intermediate state is about 60 milliseconds.

At time C, switching mechanism 16 is closed, thereby connecting voltage source T to load 20. Current now flows from voltage source T to load 20. Because switching mechanism 14 is still closed, current also flows from voltage source S to voltage source T. Because the resistance of load 20 is much greater than the resistance of voltage source T, almost all of the current from voltage source S flows towards voltage source T. The magnitude of the current from voltage source S to voltage source T depends on the resistance of resistor 18 and on the voltages.

At time D, switching mechanism 14 is opened, thereby disconnecting voltage source S from load 20. Load 20 now is connected only to voltage source T, as is desired.

FIGS. 2B, 2C and 2D show the currents received by system 10 from the electrical power grid, as a function of time. FIG. 2E shows the voltage across load 20, as a function of time. That FIGS. 2A and 2E share a common time coordinate allows the phase of the voltage across load 20 to be inspected visually. Before time A, when the voltage across load 20 is from voltage source R, the voltage across load 20 is in phase with voltage source R. Between times B and C, when the voltage across load 20 is from voltage source S, the voltage across load 20 is in phase with voltage source S. After time D, when the voltage across load 20 is from voltage source T, the voltage across load 20 is in phase with voltage source T.

If switching mechanisms 12, 14 and 16 are mechanical switches, then at times A, B, C and D, when one of switching mechanisms 12, 14 and 16 is opened or closed, the voltage across load 20 may change non-uniformly, with a consequent adverse impact on the uniformity of the sinusoidal waveforms of the electrical power grid. Therefore, it is preferable, in high current applications, for each switching mechanism 12, 14 and 16 to be a mechanical switch in parallel with a thyristor. Similarly, in low current applications, it is preferable for each of switching mechanisms 12, 14 and 16 to be a thyristor. This is because two conditions must be satisfied for a thyristor to open. Even after a thyristor receives a command to open, it remains closed until the voltage drop across it falls to almost zero. If switching mechanisms 12, 14 and 16 include thyristors, then voltage source R or S is disconnected from load 20 only when the voltage drop across the respective thyristor falls almost to zero, with almost no consequent impact on the sinusoidal waveforms of the electrical power grid. Most preferably, the thyristors are TRIACs.

When switching mechanisms 12, 14 and 16 are thyristors in series with mechanical switches, then, preferably, disconnecting is done by first opening the thyristor and then opening the mechanical switch; and connecting is done by first closing the mechanical switch and then closing the thyristor. When switching mechanisms 12, 14 and 16 are thyristors in parallel with mechanical switches, then, preferably, disconnecting is done by first opening the mechanical switch and then opening the thyristor; and connecting is done by first closing the thyristor and then closing the mechanical switch.

Figure 3:
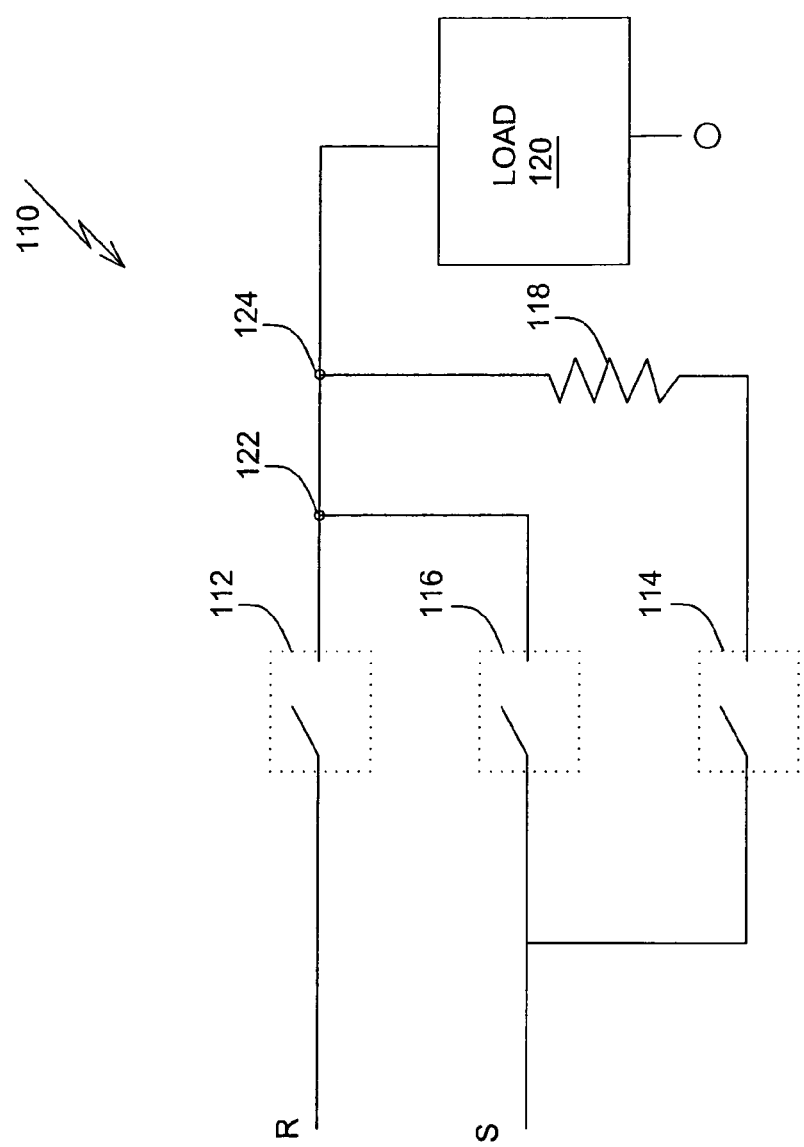
FIG. 3 is a circuit diagram of a second embodiment of a system of the present invention.

In the above example, the temporary voltage source was separate from the initial and final voltage sources. FIG. 3 is a circuit diagram of a system 100 of the present invention in which the temporary voltage source obtains voltage from the final voltage source. The two permanent voltage sources in FIG. 3 are two phases, R and S of AC voltage.

System 100 includes three switching mechanisms 112, 114 and 116. Switching mechanism 112 alternately connects a load 120 to voltage source R and disconnects load 120 from voltage source R. Switching mechanism 116 alternately connects load 120 directly to voltage source S and disconnects load 120 from voltage source S. Switching mechanism 114 also alternately connects load 120 to voltage source S and disconnects load 120 from voltage source S, but via a resistor 118. The connection of voltage source R to load 120 and the direct connection of voltage source S to load 120 are via a common connection point 122. The connection of voltage source S to load 120 via resistor 118 is via a connection point 124 that is between load 120 and common connection point 122.

It now will be described how the present invention transfers load 120 from voltage source R to the direct connection to voltage source S.

Initially, switching mechanism 112 is closed and switching mechanisms 114 and 116 are open, so that load 120 is connected only to voltage source R.

First, switching mechanism 114 is closed, thereby connecting voltage source S to load 120 via resistor 118, and thereby allowing current from voltage source S to flow towards load 120 and towards voltage source R. Because the resistance of load 120 is much greater than the resistance of voltage source R, almost all of the current from voltage source S flows towards voltage source R. The magnitude of the current from voltage source S to voltage source R depends on the resistance of resistor 118 and on the voltages.

Second, switching mechanism 112 is opened, thereby disconnecting voltage source R from load 120. The flow of current from voltage source R to load 120 ceases. The flow of current from voltage source S to voltage source R also ceases. Instead, because the only path now available to the current from voltage source S is the path that leads to load 120, the current from voltage source S now flows to load 120. In this intermediate state, the voltage across load 120 depends on how the voltage from voltage source S is divided between resistor 118 and load 120.

Third, switching mechanism 116 is closed, thereby connecting voltage source S directly to load 120. Current now flows from voltage source S to load 120 both directly and via resistor 118. Note that, unlike the example of FIGS. 1 and 2, in which, the temporary voltage source (S) was separate from the final voltage source (T), in the time interval between times C and D current flowed from temporary voltage source S both in the direction of load 20 and in the direction of voltage source T, in the present example, current from source S flows only in the direction of load 120.

Finally, switching mechanism 114 is opened, thereby disconnecting the connection of voltage source S to load 120 via resistor 118. Load 120 now is connected only directly to voltage source S.

The present invention has been described as applied to phase balancing. It will be clear to those skilled in the art how to apply the principles of the present invention to other circumstances in which a load must be transferred from one AC voltage source to another.

While the invention has been described with respect to a limited number of embodiments, it will be appreciated that many variations, modifications and other applications of the invention may be made.

What is claimed is:

1. A method of transferring a load from an initial voltage source to a final voltage source, the load being initially connected to the initial voltage source, comprising the steps of:
   (a) connecting a temporary voltage source to the load;
   (b) subsequent to said connecting of said temporary voltage source to the load, disconnecting the initial voltage source from the load;
   (c) subsequent to said disconnecting of said initial voltage source from the load, connecting the final voltage source to the load; and
   (d) subsequent to said connecting of the final voltage source to the load, disconnecting said temporary voltage source from the load;
wherein a duration of a connection of said temporary voltage source to the load is substantially shorter than a duration of a connection of the initial voltage source to the load, and wherein said duration of said connection of said temporary voltage source to the load is substantially shorter than a duration of the final voltage source to the load.

2. The method of claim 1, wherein said connecting of said temporary voltage source to the load also connects said temporary voltage source to the initial voltage source.

3. The method of claim 2, wherein said disconnecting of the initial voltage source from the load also disconnects the initial voltage source from said temporary voltage source.

4. The method of claim 1, wherein said connecting of the final voltage source to the load also connects the final voltage source to the temporary voltage source.

5. The method of claim 4, wherein said disconnecting of said temporary voltage source from the load also disconnects said temporary voltage source from the final voltage source.

6. The method of claim 1, wherein said temporary voltage source is connected to the load via a resistor.

7. The method of claim 6, wherein said resistor has a resistance at most one-tenth of a resistance of the load.

8. The method of claim 1, wherein said connecting and said disconnecting are effected using respective switching mechanisms of said initial, final and temporary voltage sources.

9. The method of claim 8, wherein at least one of said switching mechanisms includes a mechanical switch.

10. The method of claim 8, wherein at least one of said switching mechanisms includes a thyristor.

11. The method of claim 8, wherein at least one of said switching mechanisms includes both a mechanical switch and a thyristor.

12. The method of claim 11, wherein said mechanical switch and said thyristor are in parallel.

13. The method of claim 11, wherein said mechanical switch and said thyristor are in series.

14. The method of claim 1, wherein a duration of a simultaneous connection of both the initial voltage source and said temporary voltage source to the load is substantially shorter than said duration of said connection of said temporary voltage source to the load, and wherein a duration of a simultaneous connection of both the final voltage source and said temporary voltage source to the load is substantially shorter than said duration of said connection of said temporary voltage source to the load.

* * * * *